(12) United States Patent
Jilani et al.

(10) Patent No.: US 11,876,272 B2
(45) Date of Patent: Jan. 16, 2024

(54) FUEL-CELL STACK COMPRISING A TENSIONING DEVICE

(71) Applicants: Audi AG, Ingolstadt (DE); Volkswagen AG, Wolfsburg (DE)

(72) Inventors: Adel Jilani, Burnaby (CA); Siva Sankar Voosani Krishna, Burnaby (CA)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 420 days.

(21) Appl. No.: 16/966,769

(22) PCT Filed: Jan. 18, 2019

(86) PCT No.: PCT/EP2019/051203
§ 371 (c)(1),
(2) Date: Jul. 31, 2020

(87) PCT Pub. No.: WO2019/149543
PCT Pub. Date: Aug. 8, 2019

(65) Prior Publication Data
US 2021/0043959 A1 Feb. 11, 2021

(30) Foreign Application Priority Data
Jan. 31, 2018 (DE) ...................... 10 2018 201 436.1

(51) Int. Cl.
*H01M 8/248* (2016.01)
(52) U.S. Cl.
CPC ........ *H01M 8/248* (2013.01); *H01M 2250/20* (2013.01)

(58) Field of Classification Search
CPC ... H01M 8/247; H01M 8/248; H01M 2250/20
See application file for complete search history.

(56) References Cited

U.S. PATENT DOCUMENTS

| 5,993,987 | A | * | 11/1999 | Wozniczka | ........... | H01M 8/247 |
| | | | | | | 429/511 |
| 6,040,072 | A | * | 3/2000 | Murphy | .................... | C25B 9/70 |
| | | | | | | 429/470 |
| 10,892,509 | B2 | * | 1/2021 | Myers | ................... | H01M 8/248 |

(Continued)

FOREIGN PATENT DOCUMENTS

| DE | 10 2004 027 694 A1 | 8/2005 |
| DE | 10 2006 028 498 A1 | 12/2007 |

(Continued)

*Primary Examiner* — Milton I Cano
*Assistant Examiner* — Mary G Henshaw
(74) *Attorney, Agent, or Firm* — Seed IP Law Group LLP

(57) ABSTRACT

A fuel-cell stack has a first end plate and a second end plate and a plurality of fuel cells arranged between the end plates. At least one elastic tensioning element is tensioned in the stack direction between the end plates. Furthermore, a re-tensioning element is arranged between the tensioning element and a surface section of the fuel-cell stack. The re-tensioning element has a tensioning body and at least one adjusting element arranged between the tensioning body and the surface section. A distance between the tensioning body and the surface section can be variably adjusted and fixed by the at least one adjusting element.

6 Claims, 3 Drawing Sheets

(56) References Cited

U.S. PATENT DOCUMENTS

| | | | | |
|---|---|---|---|---|
| 2004/0018407 | A1* | 1/2004 | Barbir | H01M 8/0247 |
| | | | | 429/514 |
| 2005/0042493 | A1* | 2/2005 | Fujita | H01M 8/04186 |
| | | | | 429/454 |
| 2006/0093890 | A1* | 5/2006 | Steinbroner | H01M 8/248 |
| | | | | 429/511 |
| 2008/0044713 | A1* | 2/2008 | Fritz | H01M 8/248 |
| | | | | 429/510 |
| 2015/0380761 | A1* | 12/2015 | Watanabe | H01M 8/2404 |
| | | | | 29/730 |
| 2017/0288254 | A1* | 10/2017 | Strahl | H01M 8/2404 |
| 2019/0140302 | A1* | 5/2019 | Lee | H01M 8/2475 |

FOREIGN PATENT DOCUMENTS

| | | | | |
|---|---|---|---|---|
| DE | 10 2010 007 981 A1 | | 8/2011 | |
| DE | 202013003672 U1 | * | 8/2014 | ........ H01M 10/0481 |
| DE | 10 2016 205 284 A1 | | 10/2017 | |
| DE | 10 2017 206 729 A1 | | 11/2017 | |
| EP | 1 870 952 A2 | | 12/2007 | |
| JP | H0613101 A | * | 6/1992 | |
| JP | 2002-63929 A | | 2/2002 | |
| JP | 2013-20740 A | | 1/2013 | |
| KR | 20110005874 U | * | 2/2011 | |
| WO | 2005/045981 A1 | | 5/2005 | |
| WO | WO-2011098277 A1 | * | 8/2011 | ............ H01M 8/248 |
| WO | WO-2021121778 A1 | * | 6/2021 | ............ H01M 8/248 |

\* cited by examiner

FUEL-CELL STACK COMPRISING A TENSIONING DEVICE

BACKGROUND

Technical Field

Embodiments of the invention relate to a fuel-cell stack which enables a re-tensioning, in particular by adapting the compression tensile force acting on the fuel-cell stack due to at least one tensioning element. Additionally, embodiments of the invention relate to a vehicle device having such a fuel-cell stack.

Description of the Related Art

Fuel cells use the chemical conversion of a fuel with oxygen to water to generate electrical energy. For this purpose, fuel cells a membrane electrode assembly (MEA) with a membrane electrode unit.

The membrane electrode unit is formed by a proton exchange membrane, PEM, on both sides of which catalytic electrodes are arranged. Thereby, the membrane separates the anode chamber assigned to the anode and the cathode chamber assigned to the cathode from each other and electrically isolates them. It is also possible to arrange gas diffusion layers on the sides of the electrodes that do not face toward the membrane.

During operation of the fuel cell, a fuel containing hydrogen is fed to the anode, on which an electrochemical oxidation of $H_2$ to $H^+$ takes place, releasing electrons. Via the electrolytic membrane, a water-bound or water-free transport of the protons $H^+$ from the anode chamber into the cathode chamber takes place. The electrons provided at the anode are guided to the cathode via an electrical line.

The cathode is supplied with an oxygen-containing operating medium, such that a reduction of $O_2$ to $O_2^-$ takes place there while absorbing the electrons. Such oxygen anions react in the cathode chamber with the protons transported across the membrane to form water.

As a rule, a fuel cell stack is formed by a large number of MEAs arranged in a stack one above the other in the stacking direction, the electrical outputs of which add up. Bipolar plates are typically arranged between the membrane-electrode assemblies, which ensure a supply of the individual MEAs with the reactants and a coolant and also act as an electrically conductive contact to the membrane-electrode assemblies.

Seals are arranged between the membrane electrode units and the bipolar plates in order to seal off the anode and cathode spaces from the outside and to prevent operating media from escaping from the fuel-cell stack. Such seals are provided on the membrane electrode assemblies, the bipolar plates or such two components.

To permanently seal the stack and to ensure electrical contact between bipolar plates and membrane-electrode assemblies, the fuel cell stack is compressed prior to commissioning. Furthermore, tension elements are used to press the fuel cell stack even during operation.

Various tension elements are known from the prior art. For example, two end plates arranged at the ends of the fuel-cell stack can be connected by means of tension elements. The fuel cell stack is compressed by introducing tensile forces via the tension elements into the end plates. Threaded rods, tie rods, chains or the like can be used as tension elements.

The use of tensioned strip or band-shaped elastic tensioning elements is also known; these are either connected to the end flaps or at least partially surround the stack in at least one cross-section (in the direction of the stack). With regard to the design and fastening options of such elastic tensioning elements (tension elements), reference is made, for example, to EP 1 870 952 A2, the contents of which are hereby referred to in their entire scope.

In particular in the active regions of the fuel-cell stack or of the MEAs, operationally dictated changes in height can occur, which can vary, for example, with the temperature and the moisture content of the fuel-cell stack. It is also said that the stack "breathes." In addition, when elastic tensioning elements are used, the elasticity of these tensioning elements can decrease over time. In particular in the case of metallic tensioning elements which annularly surround the fuel-cell stack and thus have a plurality of 90° bends, this results in lengthening of the tensioning elements, in particular in the region of these bends.

Irrespective of the changes in height of the fuel-cell stack and the aging of the tensioning elements, sufficient compression of the stack must always be ensured, in particular in order to guarantee the sealing effect of the seals used. Therefore, means are already known from the prior art with which attempts are made to continuously ensure the compression of a fuel-cell stack.

DE 10 2006 028 498 A1 discloses a tensioning device for a fuel-cell stack having at least one tension element for clamping the fuel-cell stack and at least one longitudinal expansion compensation element, which is integrated in a tension element or connects two tension elements to one another.

DE 10 2004 027 694 A1 discloses a fuel-cell stack having a plurality of fuel cells arranged between end plates. A tensioning system, in particular a disc spring, is arranged between an end plate and a clamping means. In the untensioned state, the disc spring has a curvature open in the direction of the tensioning means and, in the tensioned state, rests approximately flat against the end plate.

According to the aforementioned publications, tension peaks which occur as a result of the expansion of the stack are to be avoided by means of elastic elements. Moreover, by initial overstretching of the elastic elements, a change in height of the stack is to be avoided to a limited extent. However, the elastic elements themselves are subject to aging and, at least as a result, the possible adjustment of the compressive force is inaccurate and passive.

DE 10 2010 007 981 A1 discloses a fuel-cell stack having fuel cells arranged between two end plates and at least one clamping means connecting the end plates for exerting a tensile force. A fastening element, which is formed as an eccentric element or contains an eccentric element, is arranged between the clamping means and at least one of the end plates. By turning the fastening element, a distance between the end plates is changed, and thus a tensile force between the end plates is adjusted.

The aforementioned document discloses a compression system with a complicated structure which requires specially adapted end plates and/or clamping means. In addition, the compression system is not suitable for use with surrounding tensioning elements.

BRIEF SUMMARY

Embodiments of the invention overcome the disadvantages of the prior art and provide a solution for re-tensioning a fuel-cell stack which can be integrated without any largescale adaptation into existing fuel-cell stacks, in particular in those with surrounding band- or strip-shaped tensioning elements.

This object is achieved by a fuel-cell stack having a first end plate and a second end plate and a plurality of fuel cells arranged in the stack direction between the two end plates. Furthermore, the fuel-cell stack has at least one elastic tensioning element tensioned in the stack direction between the end plates. At least one re-tensioning element is arranged between the tensioning element, preferably the tensioned tensioning element (the tensioning element in the tensioned state), and a surface section of the fuel-cell stack, preferably a surface section of one of the end plates. The re-tensioning element has a tensioning body and at least one adjusting element arranged between the tensioning body and the surface section. The tensioning body and the adjusting element are preferably connected to one another, wherein this connection can be made in a purely frictional way.

According to some embodiments of the invention, a distance between the tensioning body and the surface section, preferably a distance in the normal direction of the surface section, can be variably adjusted by means of the at least one adjusting element. In other words, the at least one adjusting element is configured to variably adjust a distance between the tensioning body and the surface section. Particularly preferably, the distance between a point of the re-tensioning element, preferably a point which is furthest away from the surface section in the normal direction, and the surface section can be variably adjusted by means of the at least one adjusting means.

Furthermore, the tensioning body can be secured (fixed) to the surface section by means of the at least one adjusting element at a selected distance in the normal direction of the surface section. In other words, the at least one adjusting means is further configured to secure (fix) the tensioning body at a variable distance from the surface section. Preferably, a further undesired displacement of the tensioning body by a force exerted by the adjusting element or tensioning element is avoided by the securing or fixing of the adjusting element.

A fuel-cell stack according to some embodiments of the invention thus enables the at least one tensioning element to be re-tensioned by increasing the fixed distance between the tensioning body of the re-tensioning element and a surface section of the fuel-cell stack by means of at least one adjusting element. This causes the elastic tensioning element to lengthen, thereby increasing the compression tensile force it exerts on the fuel-cell stack. The elastic tensioning element of the fuel-cell stack is preferably tensioned in the Hooke region. Furthermore, the re-tensioning element may enable a re-tensioning of the tensioning element in a stack direction (S) of the fuel-cell stack and/or transversely to a stack direction (S) of the fuel-cell stack.

The tensioning element is preferably an elastic tensioning element known from the prior art which is fastened to each of the end plates of the fuel-cell stack or substantially completely surrounds (in other words annularly) the fuel-cell stack in at least one cross-section along the stack direction. The tensioning element rests flat against a surface of the fuel-cell stack at least in sections. The re-tensioning element preferably replaces a section of such a surface and/or is preferably arranged in a recess of such a surface.

The tensioning element is preferably formed as a band- or strip-shaped flexible and/or elastic tensioning element, as is known, for example, from EP 1 870 952 A2. The tensioning element preferably consists of an elastic plastic, an elastic polymer (for example, nylon) or an elastic metal and, under standard conditions, has a modulus of elasticity >1 GPa and particularly preferably >5 GPa along the tensioning direction.

The tensioning element is further preferably fixed to at least one stack end plate in an integrally bonded manner and/or by means of at least one tensioning means. In order to ensure the easy dismantling of the fuel cell stack, the tensioning element is preferably detachably fixed to at least one end plate of the stack. Particularly preferably, the tensioning element is hooked onto the end plate. For this purpose, the end plate preferably has at least one suspension hook for suspending the tensioning element on one of its side surfaces or on its surface facing outwards in the stacking direction. The tensioning element also preferably has at least one suspension opening for being suspended on a suspension hook.

Alternatively, the at least one tensioning element extends in a cross-section in the stack direction at least essentially around a circumference of the fuel-cell stack. Thereby, a tensioning element is fixed at at least one of its end areas to another end area of the same tensioning element or to another tensioning element. Thus, the tensioning element can be formed to be closed in a ring shape.

Particularly preferably, the end area of at least one tensioning element is connected in a positive-locking manner to another end area of the same tensioning element, for example by a crimp connection. Likewise preferably, one end area of the at least one tensioning element is fixed to another end area of the same or another tensioning element by means of a fastening device. Particularly preferably, one end area of the at least one tensioning element is welded to another end area of the same or another tensioning element.

Particularly preferably, the fuel-cell stack has a plurality of tensioning elements clamped between the end plates in the stack direction. A re-tensioning element is arranged between one or more, preferably between all, of the tensioning elements and a plurality of surface sections of the fuel-cell stack.

The tensioning body of the re-tensioning element is preferably adapted to the shape and the material of the tensioning element. When band-shaped or strip-shaped tensioning elements are used, the tensioning body preferably has a width adapted to the width of the tensioning element. Furthermore, the tensioning body preferably has at least one rounded edge which comes into contact with the tensioning means. A force exerted on the tensioning means due to the displacement of the tensioning body by means of the at least one adjusting means is thus advantageously distributed uniformly on the tensioning means.

In a preferred embodiment, at least one tensioning element rests flat against a surface of the fuel-cell stack at least in sections. Particularly preferably, this surface has the said surface section, and between it and the tensioning means is arranged the re-tensioning element. Furthermore, it is preferably a surface or a surface section of the first or second end plate. According to this preferred embodiment, the re-tensioning element is arranged in a recess in the surface. The tensioning body is particularly preferably adapted to the dimensions of the recess. The re-tensioning element, in particular the tensioning body, is particularly preferably designed retractable in the recess. If the re-tensioning element is arranged in a recess in the surface, said surface section is preferably located in the recess.

The embodiment described above advantageously makes it possible for the re-tensioning element to be completely recessed in the recess in a first configuration. The tensioning element thus rests level and flat against the surface. Further, the re-tensioning element has a second configuration in which it protrudes from the recess and above the surface. Thus, the tensioning means rests level and flat against the surface only sectionally and is stretched (extended or elongated) in the region of the recess by the re-tensioning element in a normal direction of the surface. As a result of the lengthening of the tensioning means, the compression tensile force exerted thereby increases as in the case of a spring.

The re-tensioning element is likewise preferably not completely recessed in the recess during tensioning of the tensioning means. Thus, by lowering the tensioning body, it is also possible to reduce the compressive force, for example in the event of an operation-related increase in the stack height.

In a preferred embodiment of the fuel-cell stack, the at least one adjusting element can be extended from the tensioning body. In other words, in a first configuration, the adjusting element is recessed at least in sections in the tensioning body and protrudes further out of the tensioning body in a second configuration than in the first configuration. The at least one adjusting element is particularly preferably a pin which can be moved in and out of the tensioning body by means of microactuators. The at least one adjusting element can likewise preferably be extended pneumatically or hydraulically from the tensioning body. The at least one adjusting element is preferably a threaded rod which can be moved in and out of the tensioning body. The threaded rod is preferably magnetically rotatable. Alternatively, the adjusting element, in particular the threaded rod, can preferably be moved out of the tensioning body, in particular turned, by means of a suitable tool.

Alternatively or additionally, the at least one adjusting element has an expandable design. For example, the adjusting element is formed as a scissors drive or has a scissors drive. The adjusting element is likewise preferably of formed hollow and can be expanded by introducing a fluid. The at least one adjusting element is likewise preferably formed to be remotely controllable. The variable setting of a fixed distance between the tensioning body and the surface section is thus carried out by means of remote control, for example by means of radio remote control.

In a likewise preferred embodiment, the at least one adjusting element has a thread which engages in a threaded bore of the surface section. In this embodiment, the distance between the tensioning body and the surface section is variably adjusted by turning the threaded rod within the threaded bore. Furthermore, in this embodiment, the at least one adjusting element is preferably connected only frictionally to the tensioning body, particularly preferably it is arranged with an interference fit between the tensioning body and the surface section. The threaded rod is preferably turned by engagement with a suitable tool. For this purpose, the threaded bore is preferably arranged in a projecting section of an end plate in order to allow tool engagement. Alternatively, the threaded rod is turned also in this case by means of remote control.

The said surface section may be arranged at various locations of the fuel-cell stack. If the at least one tensioning element is fixed to a respective side face of the first and second end plate by means of tensioning means, the surface section is preferably located between the tensioning means on a side face of the first or second end plate. The tensioning element is then preferably re-tensioned by means of the at least one re-tensioning element in a direction transverse to the stack direction (S) of the fuel-cell stack. If by contrast the tensioning element is fixed to each of the surfaces of a first and second end plate that face outward in the stack direction or is formed as a closed ring, then over a corner and a side surface of the end plate to the opposite end plate. The surface section is then preferably located on one of the outwardly facing surfaces of the first or second end plate and/or on a side surface of the first or second end plate. If the surface section is located on one of the outwardly facing surfaces of the first and/or second end plate, the tensioning element is preferably re-tensioned by means of the re-tensioning element in a direction parallel to the stack direction (S).

In a particularly preferred embodiment, the recess is arranged in an edge of the first end plate or the second end plate that is to the outside in the stack direction. In other words, the said surface section extends from an outer edge of an end plate along the outwardly facing surface and along the side surface of this end plate. According to this embodiment, a distance between the tensioning body and a first surface section in the normal direction of the first surface section can be variably adjusted and fixed by means of at least a first adjusting element, and a distance between the tensioning body and a second surface section in the normal direction of the second surface section can be variably adjusted and fixed by means of at least a second adjusting element. The tensioning body can thus advantageously be displaced in two directions and consequently the lengthening of the tensioning means can preferably also be controlled in a plurality of directions. The compression tensile force which is substantially in opposition to the lengthening can thus likewise be readjusted in two different directions.

In this particularly preferred embodiment, the re-tensioning element thus has at least one first adjusting element and at least one second adjusting element. The re-tensioning element likewise preferably has a plurality of first and second adjusting elements.

Particularly preferably, the first surface section is plane-parallel to an outwardly facing surface, and the second surface section is plane-parallel to a side surface of the first end plate or the second end plate. Thus, the tensioning body can be displaced in a direction perpendicular to the outwardly facing surface of the end plate and in a direction perpendicular to the side face of the end plate. Thus, a section of a tensioning means extending along the end plate or a section of a tensioning means extending along a side surface of the fuel-cell stack can be intentionally lengthened. Consequently, the compression tensile force acting on the fuel-cell stack along the end plate or perpendicular to the end plate can be readjusted. Preferably, the first surface section is perpendicular to the second surface section. Particularly preferably, a re-tensioning of the tensioning element in the stack direction (S) and transversely to the stack direction (S) is thus possible.

Furthermore, the end plate, in whose edge lying to the outside in the stack direction the recess is arranged, preferably projects over the fuel-cell stack in the lateral direction, that is, in a direction parallel to the outwardly facing surface of the end plate. Furthermore, the first adjusting means are preferably formed as threaded rods which engage with threaded holes (threaded bores) arranged in the projecting section of the end plate. Thus, a distance of the tensioning body perpendicular to the end plate can also be adjusted by turning the threaded rods by means of tool engagement. The second adjusting means are preferably extendable or expandable from the tensioning body.

The present disclosure also relates to a vehicle, in particular a vehicle powered by electric motor, comprising a fuel-cell stack according to the description herein. The fuel-cell stack serves in particular to power an electric motor of the vehicle.

BRIEF DESCRIPTION OF THE SEVERAL VIEWS OF THE DRAWINGS

Embodiments of the invention are explained below with reference to the respective drawings.

DETAILED DESCRIPTION

Figure 1:
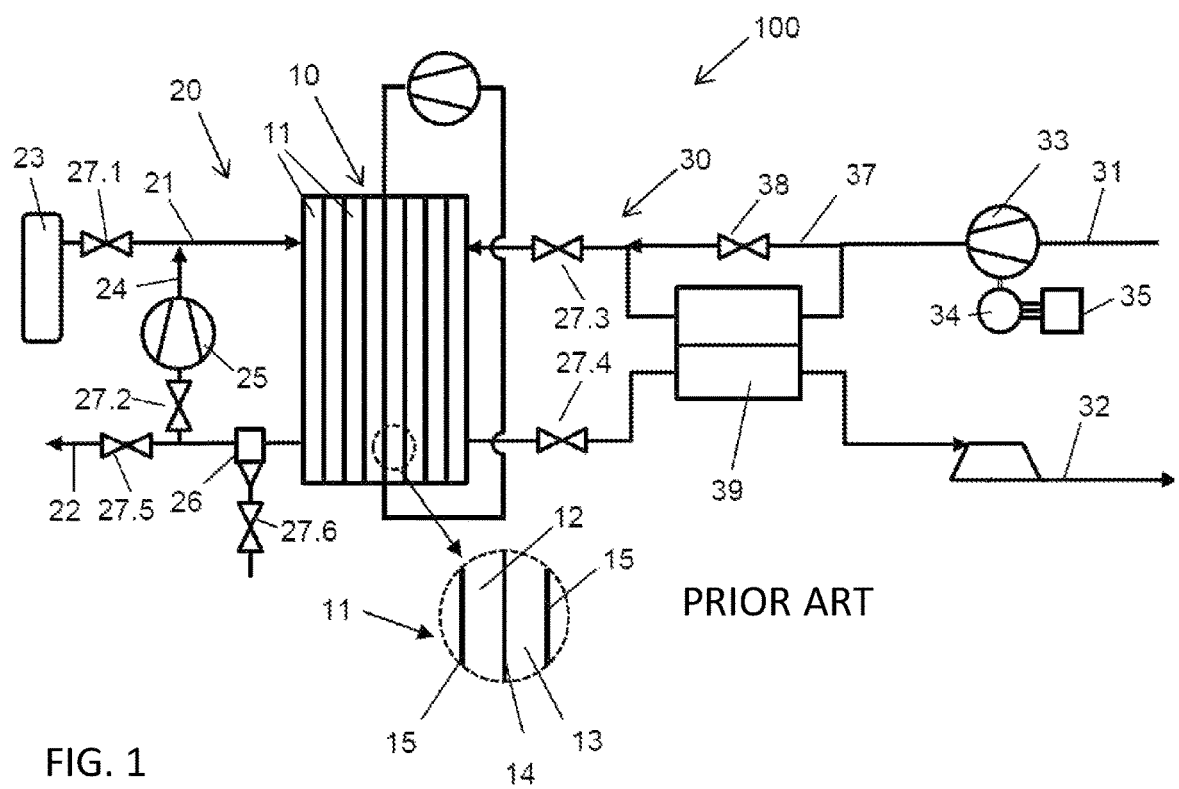
FIG. 1 is a schematic representation of a fuel cell system according to the prior art.

FIG. 1 shows a fuel cell system designated in total with 100, in accordance with the prior art. The fuel cell system 100 is part of a vehicle (not shown), in particular an electric vehicle, which has an electric traction motor, which is supplied with electrical energy by the fuel cell system 100.

The fuel cell system 100 comprises as core components a fuel cell stack 10, which comprises a plurality of individual cells 11, which are arranged in the form of a stack and which are formed by alternately stacked membrane electrode assemblies (EAs) 14 and bipolar plates 15 (see detailed view). Each individual cell 11 thus respectively comprises an MEA 14 with an ion-conductive polymer electrolyte membrane not shown in more detail here and catalytic electrodes arranged thereon on both sides. These electrodes catalyze the respective partial reaction of the fuel conversion. The anode and cathode electrodes are designed as coating on the membrane and comprise a catalytic material, such as platinum, which is provided on an electrically conductive substrate material, with a large specific surface, such as a carbon-based material.

As shown in the detailed view of FIG. 1, an anode chamber 12 is formed between a bipolar plate 15 and the anode and the cathode chamber 13 is formed between the cathode and the next bipolar plate 15. The bipolar plates 15 serve to supply the operating media in the anode and cathode chambers 12, 13 and further establishes the electrical connection between the individual fuel cells 11. Optionally, gas diffusion layers can be arranged between the membrane electrode assemblies 14 and the bipolar plates 15.

In order to supply the fuel cell stack 10 with the operating medium, the fuel cell system 100 has an anode supply 20, on the one hand, and a cathode supply 30, on the other hand.

The anode supply 20 of the fuel cell system 100 shown in FIG. 1 comprises an anode supply path 21, which serves to supply an anode operating medium (the fuel), such as hydrogen, to the anode chambers 12 of the fuel cell stack 10. For this purpose, the anode supply path 21 connects a fuel reservoir 23 to an anode inlet of the fuel cell stack 10. The feed pressure of the anode operating medium into the anode chambers 12 of the fuel cell stack 10 is adjusted via a metering valve 27.1. The anode supply 20 also comprises an anode exhaust path 22 which discharges the anode exhaust gas from the anode chambers 12 via an anode outlet of the fuel cell stack 10.

In addition, the anode supply 20 of the fuel cell system 100 shown in FIG. 1 has a recirculation line 24, which connects the anode exhaust gas path 22 with the anode supply path 21. The recirculation of fuel is a common practice in order to return the hyperstoichiometrically used fuel to the fuel cell stack 10. A recirculation conveying device 25, preferably a recirculation fan along with a flap valve 27.2, are arranged in the recirculation line 24.

In addition, a water separator 26 is installed in the anode supply 22 of the fuel cell system, in order to discharge the product water resulting from the fuel cell reaction. A drain of the water separator can be connected to the cathode exhaust line 32, a water tank or an exhaust system.

The cathode supply 30 of the fuel cell system 100 shown in FIG. 1 comprises a cathode supply path 31, which supplies an oxygen-containing cathode operating medium, in particular air taken in from the environment, to the cathode chambers 13 of the fuel cell stack 10. The cathode supply 30 also comprises a cathode exhaust path 32, which discharges the cathode exhaust gas (in particular the exhaust air) from the cathode chambers 13 of the fuel cell stack 10 and supplies it, if appropriate, to an exhaust system (not shown).

For conveying and compacting the cathode operating medium, a compressor 33 is arranged in the cathode supply path 31. In the exemplary embodiment shown, the compressor 33 is designed as a compressor 33, which is mainly driven by an electric motor 34 equipped with appropriate power electronics 35.

The fuel cell system 100 shown in FIG. 1 also has a humidifier module 39 arranged upstream of the compressor 33 in the cathode supply line 31. The humidifier module 39 is arranged in the cathode supply path 31 so that, on the one hand, the cathode operating gas can flow through it. On the other hand, it is arranged in the cathode exhaust path 32 such that the cathode exhaust gas can flow through it. A humidifier 39 typically comprises a plurality of water vapor permeable membranes, which are designed to be either flat or in the form of hollow fibers. In this case, the comparatively dry cathode operating gas (air) flows over one side of the membranes and the comparatively moist cathode exhaust gas (exhaust gas) flows over the other side. Driven by the higher partial pressure of the water vapor in the cathode exhaust gas, water vapors pass over the membrane into the cathode operating gas, which is humidified in this way.

The fuel cell system 100 also has a humidifier bypass 37 connecting the cathode supply line upstream and downstream of the humidifier 39 to each other, with a flap valve arranged therein as bypass control means 38. Furthermore, flap valves 27.3 and 27.4 are arranged upstream of fuel-cell stack 10 in the anode supply line 31 and downstream of the fuel-cell stack 10 in the anode discharge line 32.

Various other details of anode and cathode supply 20, 30 are not shown in FIG. 1 for reasons of clarity. For example, the anode exhaust line 22 can open into the cathode exhaust line 32, such that the anode exhaust and the cathode exhaust are discharged via a common exhaust system.

Figure 2:
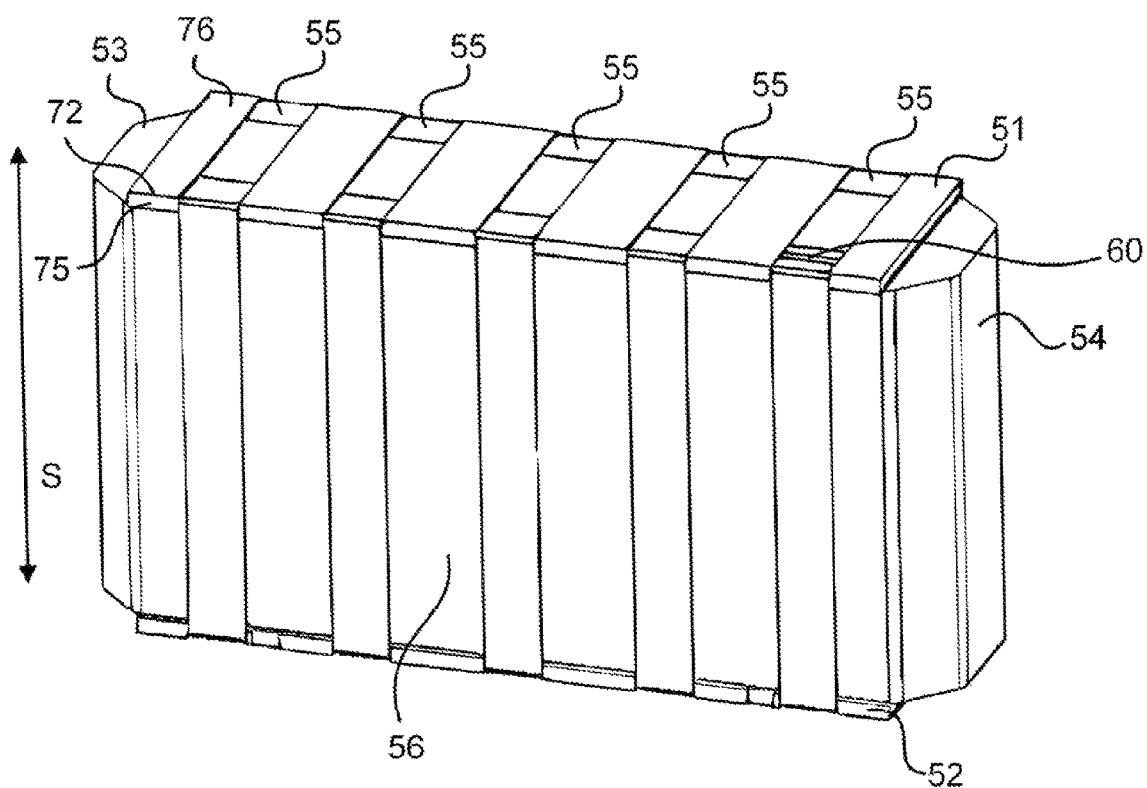
FIG. 2 illustrates a fuel-cell stack having a plurality of tensioning elements compressing the stack and a re-tensioning element in accordance with one embodiment.

FIG. 2 shows a detailed representation of the fuel cell stack 10 shown in FIG. 1. The fuel-cell stack 10 has a plurality of fuel cells stacked flat on top of one another in stack direction S. In the stack direction, the fuel-cell stack 10 is bounded by a first end plate 51 and an opposite second end plate 52. In a first direction transverse to stack direction S, the fuel-cell stack 10 is bounded by side panels 53, 54. In a second direction transverse to the first direction and transverse to stack direction S, the fuel-cell stack 10 is bounded by side panels 56.

The fuel-cell stack 10 shown in FIG. 2 is compressed via a plurality of a total of five tensioning elements 55. Each tensioning element 55 completely surrounds a cross section of the fuel-cell stack 10, passing over the end plates 51, 52 as well as the side panels 56. The tensioning elements 55 rest at least on the end plates 51, 52, and each tensioning element 55 is welded to itself in a region of the upper end plate 51.

Figure 3:
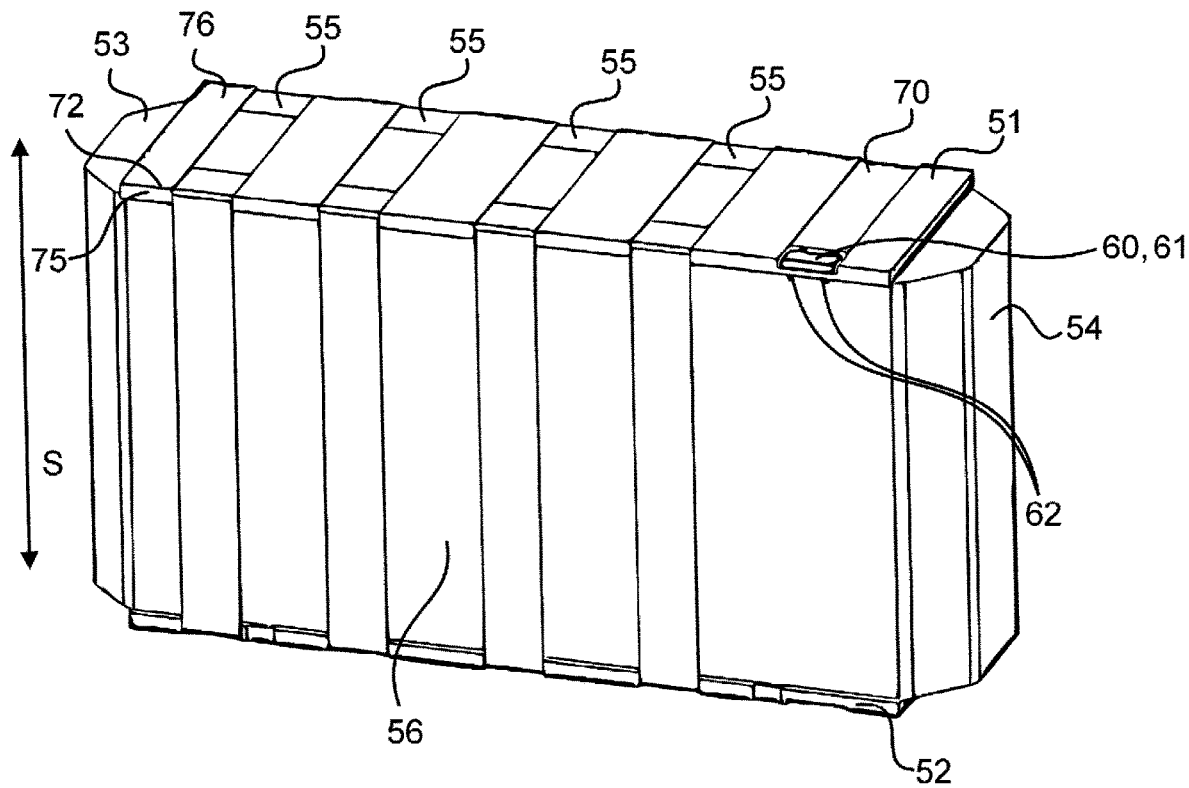
FIG. 3 illustrates the fuel-cell stack of FIG. 2 with the re-tensioning element exposed.
Figure 4:
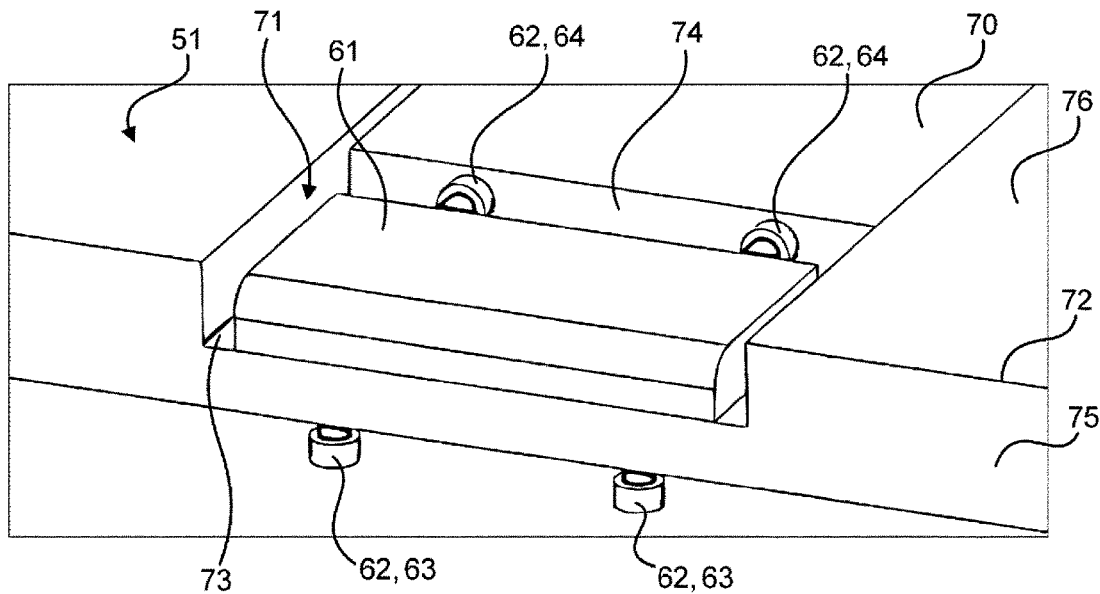
FIG. 4 is a detailed illustration of the exposed re-tensioning element of FIG. 3.
Figure 5:
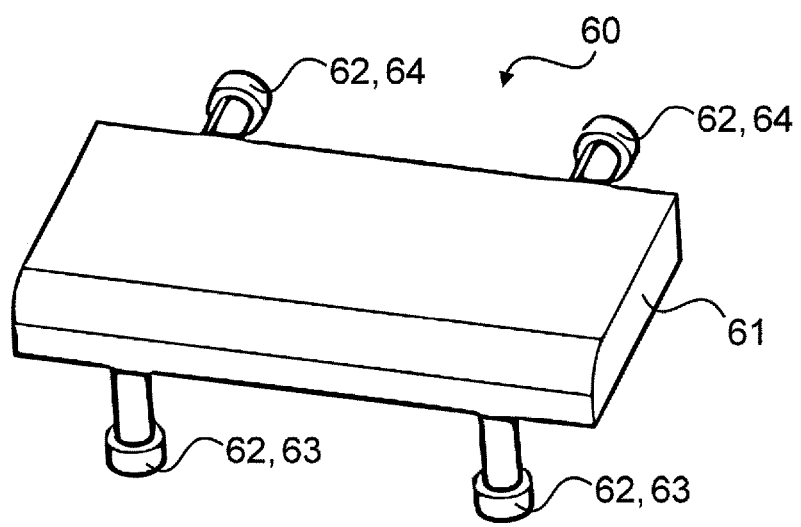
FIG. 5 is an isolated illustration of the re-tensioning element of FIG. 3.

As shown in FIGS. 2, 3 and 4, a re-tensioning element 60 is arranged below one of the tensioning elements 55 in accordance with an embodiment of the invention. An isolated illustration of this re-tensioning element 60 is given in FIG. 5. As shown in FIG. 2, the re-tensioning element 60 is characterized on the outside by a slight deformation of the tensioning element 55. The re-tensioning element 60 has a tensioning body 61 and a total of 4 adjusting elements 62.

As shown specifically in FIGS. 3 and 4, each tensioning element 55 is arranged in an associated recessed surface section 70 of the first (upper) end plate 51. Corresponding recessed surface sections are also found on the second (lower) end plate 52 of the fuel-cell stack 10. Thus, each tensioning element 55 is secured against lateral slippage.

As shown specifically in FIGS. 3 and 4, a recess 71 is arranged in the region of an outer edge 72 of the first end plate 51. The recess 71 extends over an outwardly facing surface 76 of the end plate 51 and over a side surface 75 of the end plate 51 and has a first surface section 73 and a second surface section 74.

The re-tensioning element 60 is arranged in the recess 71 and rests on the first surface section 73 of the recess 71, as shown in FIG. 4. The re-tensioning element 60 has a tensioning body 61 and two second adjusting elements 64 arranged between the tensioning body 61 and a second surface section 74. The tensioning body 61 is adapted to the recess 71 and has a smaller areal extent and height than the recess 71.

The second adjusting elements 64 are designed to be extendable from the tensioning body 61 and can be extended from the tensioning body 61, in particular by means of remote control. As can be seen from FIG. 4, the second adjusting elements 64 are not completely recessed in the tensioning body 61 in a neutral configuration of the re-tensioning element 61. In addition, the second adjusting elements 64 can also be moved further into the tensioning body 61 if required. By moving the second adjusting elements 64 in or out, the tensioning body 61 can be displaced in a first direction parallel to the outwardly facing surface 76 and normal to the side surface 75.

If the second adjusting elements 64 are extended from the tensioning body 61, the tensioning body moves outward in the first direction, so that a tensioning element 55 running over the tensioning body 61 is re-tensioned in the first direction. Thus, the compression tensile force increases along the first direction. When the second adjusting elements 64 are moved further into the tensioning body 61, the latter is displaced counter to the first direction by the tension of the tensioning element 55 and the compression tensile force of this tensioning element 55 thereby decreases.

As can further be seen from FIGS. 3 and 4, the end plate 51 projects beyond the fuel-cell stack 10 in a lateral direction. Thus, at least a portion of the first surface section 73 also laterally projects beyond the side cover 56 of the fuel-cell stack 10. Arranged in this projecting section of the first surface section 73 are two threaded holes which are engaged with the two first adjusting means 63 of the re-tensioning element 60.

The first adjusting means 63 are each formed as a threaded rod and are accessible from the outside due to the projection of the first end plate 51. The first adjusting means 63 are arranged by a press-fit between the first surface section 73 and the tensioning body 61 and are not fixedly connected to the tensioning body 61. The first adjusting means 63 extend flat on the side facing the tensioning body 61 and bear against the first tensioning body 61 with these pressing surfaces (not shown).

If the first adjusting means 63 are turned with a suitable tool, they are displaced along or against the stack direction S due to the engagement with the threaded bores (not shown) in the projecting section of the first end plate 51. As a result, either more or less pressure is exerted on the tensioning body 61 by means of the pressing surfaces (not shown) abutting the tensioning body 61.

If the first adjusting means 63 are turned using a suitable tool in such a way that they are displaced upward, for example into the threaded bores of the first end plate 51, the tensioning body 61 is displaced in a second direction parallel to the side face 75 and normal to the outwardly facing surface 76. Thus, a tensioning element 55 running over the tensioning body 61 is re-tensioned in the second direction, and the compression tensile force along the second direction increases.

If the first adjusting means 63 are turned with a suitable tool in such a way that they are displaced downwards, for example out of the threaded bores of the first end plate 51, the tensioning body 61 is displaced counter to the second direction by the tensioning of the tensioning element 55 running over it, and the compression tensile force decreases.

Consequently, the re-tensioning element 60 can increase or decrease the compression tensile force of the tensioning element 55 in the first and/or the second direction. The re-tensioning element 60 thus permits the re-tensioning of the aged elastic tensioning element 55. Likewise, the re-tensioning element 60 allows the elastic tensioning element 55 to be released in response to an increase in the stack height.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A fuel-cell stack having:
    a first end plate and a second end plate;
    a plurality of fuel cells arranged between the end plates;
    at least one elastic tensioning element tensioned in a stack direction between the end plates; and at least one re-tensioning element arranged between the tensioning element and a surface section of the fuel-cell stack, comprising a tensioning body and at least one adjusting element arranged between the tensioning body and the surface section, wherein in a first configuration, the at least one adjusting element is recessed in the tensioning body, and, in a second configuration, the at least one adjusting element protrudes further out of the tensioning body than in the first configuration,
    wherein a distance between the tensioning body and the surface section, the distance oriented in the stack direction, can be variably adjusted and fixed by the at least one adjusting element, and
    wherein at least one tensioning element rests flat against the first end plate at least in sections, and at least one re-tensioning element is arranged in a recess in the first end plate.

2. The fuel-cell stack according to claim 1, wherein the tensioning body of the at least one re-tensioning element is formed to be retractable in the recess.

3. The fuel-cell stack according to claim 1, wherein the recess is arranged in an edge of the first end plate that is to the outside in the stack direction, wherein the surface section is a first surface section of the first end plate, and wherein a distance between the tensioning body and the first surface section can be variably adjusted and fixed by at least one first adjusting element and a distance between the tensioning body and a second surface section of the first end plate can be variably adjusted and fixed by at least one second adjusting element.

4. The fuel-cell stack according to claim 3, wherein the first surface section is oriented perpendicular to the second surface section.

5. The fuel-cell stack according to claim 3, wherein the first surface section is arranged plane-parallel to an outwardly facing surface of the end plate and the second surface section is arranged plane-parallel to a side surface of the end plate.

6. A vehicle having a fuel-cell stack according to claim 1.

* * * * *